United States Patent
Peng et al.

(10) Patent No.: US 12,490,087 B2
(45) Date of Patent: Dec. 2, 2025

(54) AUTHENTICATION SERVER FUNCTION SELECTION IN AN AUTHENTICATION AND KEY AGREEMENT

(71) Applicant: ZTE Corporation, Guangdong (CN)

(72) Inventors: Jin Peng, Guangdong (CN); Shilin You, Guangdong (CN); Yuze Liu, Guangdong (CN); Wantao Yu, Guangdong (CN); Zhaoji Lin, Guangdong (CN); Yuxin Mao, Guangdong (CN); Jigang Wang, Guangdong (CN); Chen Lu, Guangdong (CN)

(73) Assignee: ZTE Corporation, Guangzhou (CN)

( * ) Notice: Subject to any disclaimer, the term of this patent is extended or adjusted under 35 U.S.C. 154(b) by 193 days.

(21) Appl. No.: 17/804,168

(22) Filed: May 26, 2022

(65) Prior Publication Data
US 2022/0295272 A1    Sep. 15, 2022

Related U.S. Application Data

(63) Continuation of application No. PCT/CN2020/087507, filed on Apr. 28, 2020.

(51) Int. Cl.
*H04W 12/041*    (2021.01)
*H04W 12/0431*    (2021.01)
*H04W 12/06*    (2021.01)

(52) U.S. Cl.
CPC ....... *H04W 12/0431* (2021.01); *H04W 12/06* (2013.01)

(58) Field of Classification Search
CPC ............. H04W 12/0431; H04W 12/06; H04W 12/041; Y02D 30/70
See application file for complete search history.

(56) References Cited

U.S. PATENT DOCUMENTS 10,499,357 B1    12/2019    Tiwari et al.
2019/0223063 A1*    7/2019    Palanigounder ...... H04W 12/04
(Continued)

FOREIGN PATENT DOCUMENTS

CN    108848502 A    11/2018
CN    110062381        7/2019
(Continued)

OTHER PUBLICATIONS

Ericsson, "pCR to TS 33.535: Update of the AKMA procedures", 3GPP TSG-SA3 Meeting #98e S3-200296, Mar. 6, 2020—Accessible at: https://www.3gpp.org/ftp/tsg_sa/WG3_Security/TSGS3_98e/AgendaWithTdocAllocation_2020-03-12_16h25.htm (Year: 2020).*

(Continued)

*Primary Examiner* — Yin Chen Shaw
*Assistant Examiner* — Nicholas Joseph Diluzio
(74) *Attorney, Agent, or Firm* — Perkins Coie LLP

(57) ABSTRACT

The present document relates to methods, systems, and devices related to digital communication, and more specifically, to techniques related to AUSF selection in the case of dual registrations in AKMA. One example data communication method includes receiving, by a first network function, a request to retrieve an identifier of a second network function that authenticated a terminal from a third function, the request including a parameter. The method also includes transmitting, by the first network function, a response to the third network function that includes the identifier of the second network function that authenticated the terminal that is identified based on the parameter.

16 Claims, 9 Drawing Sheets

(56) References Cited

U.S. PATENT DOCUMENTS

| | | | |
|---|---|---|---|
| 2019/0261179 A1* | 8/2019 | Hu | H04W 12/04 |
| 2020/0014535 A1 | 1/2020 | Baskaran et al. | |
| 2020/0092720 A1* | 3/2020 | Chin | H04L 63/162 |
| 2020/0107253 A1* | 4/2020 | Albasheir | H04W 4/90 |
| 2020/0288313 A1* | 9/2020 | Kunz | H04W 12/104 |
| 2020/0344601 A1* | 10/2020 | Baskaran | H04W 12/06 |
| 2020/0382605 A1* | 12/2020 | Ouyang | H04W 40/20 |
| 2020/0404499 A1* | 12/2020 | Zhu | H04W 12/06 |
| 2021/0168584 A1* | 6/2021 | Li | H04W 60/00 |
| 2021/0195408 A1* | 6/2021 | Yang | H04W 12/02 |
| 2021/0392495 A1* | 12/2021 | Tsiatsis | H04W 12/40 |
| 2022/0240085 A1* | 7/2022 | Long | H04W 40/246 |
| 2023/0054571 A1* | 2/2023 | Wang | H04W 4/70 |
| 2023/0068196 A1* | 3/2023 | Sasi | H04L 9/0836 |
| 2023/0231708 A1* | 7/2023 | Palanigounder | H04W 12/0431 713/171 |
| 2023/0232221 A1* | 7/2023 | Rajadurai | H04W 12/043 726/6 |

FOREIGN PATENT DOCUMENTS

| | | | |
|---|---|---|---|
| CN | 110235458 | 9/2019 | |
| CN | 110891270 A | 3/2020 | |
| WO | 2019/158028 | 8/2019 | |
| WO | 2020/007461 | 1/2020 | |
| WO | 2020/038236 | 2/2020 | |
| WO | WO-2020024764 A1 * | 2/2020 | H04L 63/08 |
| WO | WO-2020038236 A1 * | 2/2020 | |
| WO | WO-2020050138 A1 * | 3/2020 | H04L 63/205 |

OTHER PUBLICATIONS

3GPP, "3GPP TS 33.501 3rd Generation Partnership Project; Technical Specification Group Services and System Aspects; Security architecture and procedures for 5G system (Release 15)", v 15.7.0, (Dec. 31, 2019) (Year: 2019).*
TDoc list of meeting topics for 3GPP TSG-SA3 Meeting #98e (includes S3-200296), Mar. 12, 2020 (Year: 2020).*
Prasad, A. R., Arumugam, S., B, S., Zugenmaier, A., 3GPP, NEC Corporation, NEC Technologies India Pvt. Ltd., & Munich University of Applied Sciences. (2018). 3GPP 5G Security. In Journal of ICT (vols. 6-1 & 2, pp. 137-158). River Publishers. https://doi.org/10.13052/jicts2245-800X.619 (Year: 2018).*
5G; Non-Access-Stratum (NAS) protocol for 5G System (5GS); Stage 3 (3GPP TS 24.501 version 15.4.0 Release 15), (Jun. 14, 2019) (Year: 2019).*
Hu, X., Liu, C., Liu, S., You, W., Li, Y., & Zhao, Y. (2019). A Systematic analysis method for 5G Non-Access Stratum Signalling Security. IEEE Access, 7, 125424-125441. https://doi.org/10.1109/access.2019.2937997 (Year: 2019).*
International Search Report and Written Opinion for PCT/CN2020/087507, filed Apr. 29, 2020, dated Jan. 27, 2021, 9 pages.
Ericsson "AUSF selection for AKMA," 3GPP TSG-SA3 Meeting #98e S3-200294, e-meeting, Mar. 2-6, 2020, 3 pages.
Ericsson "pCR to TS 33.535: UE authentication result notification", 3GPP TSG-SA3 Meeting #98e S3-200297, e-meeting, Mar. 2-6, 2020, 2 pages.
Office Action for Co-pending CN Application No. 202080098518.7, dated Aug. 1, 2024, 24 pages with unofficial English summary.
ZTE Corporation "Defining AKMA key identifier for AKMA Anchor Key on demand procedures" 3GPP TSG-SA3 Meeting #98bis-e S3-200673, e-meeting, Apr. 14-17, 2020, 3 pages.
Ericsson "pCR to TS 33.535: Update of the AKMA procedures" 3GPP TSG-SA3 Meeting #98e S3-200296, e-meeting, Mar. 2-6, 2020, 4 pages.
Ericsson "pCR to TS 33.535: Update of the AKMA procedures" 3GPP TSG-SA3 Meeting #98e S3-200296 e-meeting, Mar. 2-6, 2020, 7 pages.
Second Office Action for co-pending Chinese Patent Application No. 202080098518.7, dated Dec. 31, 2024, with unofficial English translation, 20 pages.
Ericsson et al., "Serving network name in SNPN," 3GPP TSG-CT WG1 Meeting #120, C1-196105, Portoroz (Slovenia), Oct. 7-11, 2019, 4 pages.
CNIPA, Notification to Complete Formalities of Registration for Chinese Application No. 2020800985187, mailed on Apr. 28, 2025, 4 pages with unofficial English translation.

* cited by examiner

AUTHENTICATION SERVER FUNCTION SELECTION IN AN AUTHENTICATION AND KEY AGREEMENT

CROSS-REFERENCE TO RELATED APPLICATION

This application is a continuation and claims priority to International Application No. PCT/CN2020/087507, filed on Apr. 28, 2020, the disclosure of which is hereby incorporated by reference herein in its entirety.

TECHNICAL FIELD

This patent document is directed generally to digital communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to data communication, and more specifically, to techniques related to AUSF selection in the case of dual registrations in AKMA.

In one exemplary aspect, a method for data communication is disclosed. The method includes receiving, by a first network function, a request to retrieve an identifier of a second network function that authenticated a terminal from a third function, the request including a parameter. The method also includes transmitting, by the first network function, a response to the third network function that includes the identifier of the second network function that authenticated the terminal that is identified based on the parameter.

In another exemplary aspect, a method for data communication is disclosed. The method includes transmitting, by a first network function, a request to retrieve an identifier of a second network function that authenticated a terminal from a third network function, the request including a parameter. The method also includes receiving, by the first network function, a response from the third network function, the response including the identifier of the second network function that authenticated the terminal that is identified based on the parameter.

In another exemplary aspect, a communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for data communication, comprising: receiving, by a first network function, a request to retrieve an identifier of a second network function that authenticated a terminal from a third function, the request including a parameter; and transmitting, by the first network function, a response to the third network function that includes the identifier of the second network function that authenticated the terminal that is identified based on the parameter.

2. The solution of clause 1, wherein the first network function comprises a unified data management (UDM) function.

3. The solution of any of clauses 1 and 2, wherein the second network function comprises an Authentication Server Function (AUSF).

4. The solution of any of clauses 1, 2, and 3, wherein the third network function includes an Authentication and Key Management Application (AKMA) anchor function (AAnF).

5. The solution of clause 1, wherein the response includes a subscriber permanent identifier (SUPI).

6. The solution of clause 1, wherein the parameter includes a serving network name.

7. The solution of clause 1, wherein the request includes an identifier of the terminal.

8. The solution of clause 1, wherein the parameter includes a serving network name network identifier.

9. The solution of any of clauses 1, 2, 3, and 5, further comprising: identifying, by the first network function, a record in a database that corresponds to the second network function that authenticated the terminal based on the parameter; and retrieving, by the first network function, the identifier of the second network function that authenticated the terminal and the SUPI included in the record in the database.

10. The solution of any of clauses 1, 3, 4, and 5, wherein the third network function is configured to send a key request message to the second network function that is identified based on the identifier of the second network function that authenticated the terminal, the key request message including the SUPI.

11. The solution of clause 1, 3, and 4, wherein the second network function is configured to receive an AKMA key identifier, an identifier of the terminal, and the parameter from a fourth network function.

12. The solution of clause 11, wherein the fourth network function is an AKMA application function (AF).

13. The solution of any of clauses 11 and 12, wherein the fourth network function is configured to receive the AKMA key identifier, the identifier of the terminal, and the parameter from the terminal.

14. A solution for data communication, comprising: transmitting, by a first network function, a request to retrieve an identifier of a second network function that authenticated a terminal from a third network function, the request including a parameter; and receiving, by the first network function, a response from the third network function, the response including the identifier of the second network function that authenticated the terminal that is identified based on the parameter.

15. The solution of clause 14, wherein the first network function comprises an Authentication and Key Management Application (AKMA) anchor function (AAnF).

16. The solution of any of clauses 14-15, wherein the second network function comprises an Authentication Server Function (AUSF).

17. The solution of any of clauses 14-16, wherein the third network function comprises a unified data management (UDM) function.

18. The solution of clause 14, wherein the response includes a subscriber permanent identifier (SUPI).

19. The solution of clause 14, wherein the parameter includes a serving network name.

20. The solution of clause 14, wherein the request includes an identifier of the terminal.

21. The solution of clause 14, wherein the parameter includes a serving network name network identifier.

22. The solution of any of clauses 14-18, wherein the third network function is configured to identify a record in a database that corresponds to the second network function that authenticated the terminal based on the parameter and retrieve the identifier of the second network function that authenticated the terminal and the SUPI included in the record in the database.

23. The solution of any of clauses 14-18, further comprising: transmitting, by the first network function, a key request message to the second network function that is identified based on the identifier of the second network function that authenticated the terminal, the key request message including the SUPI.

24. The solution of any of clauses 14 and 20, further comprising: receiving, by the first network function, an AKMA key identifier, the identifier of the terminal, and the parameter from a fourth network function.

25. The solution of clause 24, wherein the fourth network function comprises an AKMA application function.

26. The solution of any of clauses 24 and 25, wherein the fourth network function is configured to receive the AKMA key identifier, the identifier of the terminal, and the parameter from the terminal.

27. An apparatus for communication comprising a processor that is configured to carry out the solution of any of clauses 1 to 26.

28. A non-transitory computer readable medium having code stored thereon, the code when executed by a processor, causing the processor to implement a solution recited in any of clauses 1 to 26.

The details of one or more implementations are set forth in the accompanying attachments, the drawings, and the description below. Other features will be apparent from the description and drawings, and from the clauses.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

An Authentication and Key Agreement for Applications (AKMA) framework can be used to support UE secure communication and exchange of data with an application server. In an AKMA architecture, the AKMA authentication can be the result of the primary/access authentication to protect communication between UE and the application server.

Figure 1:
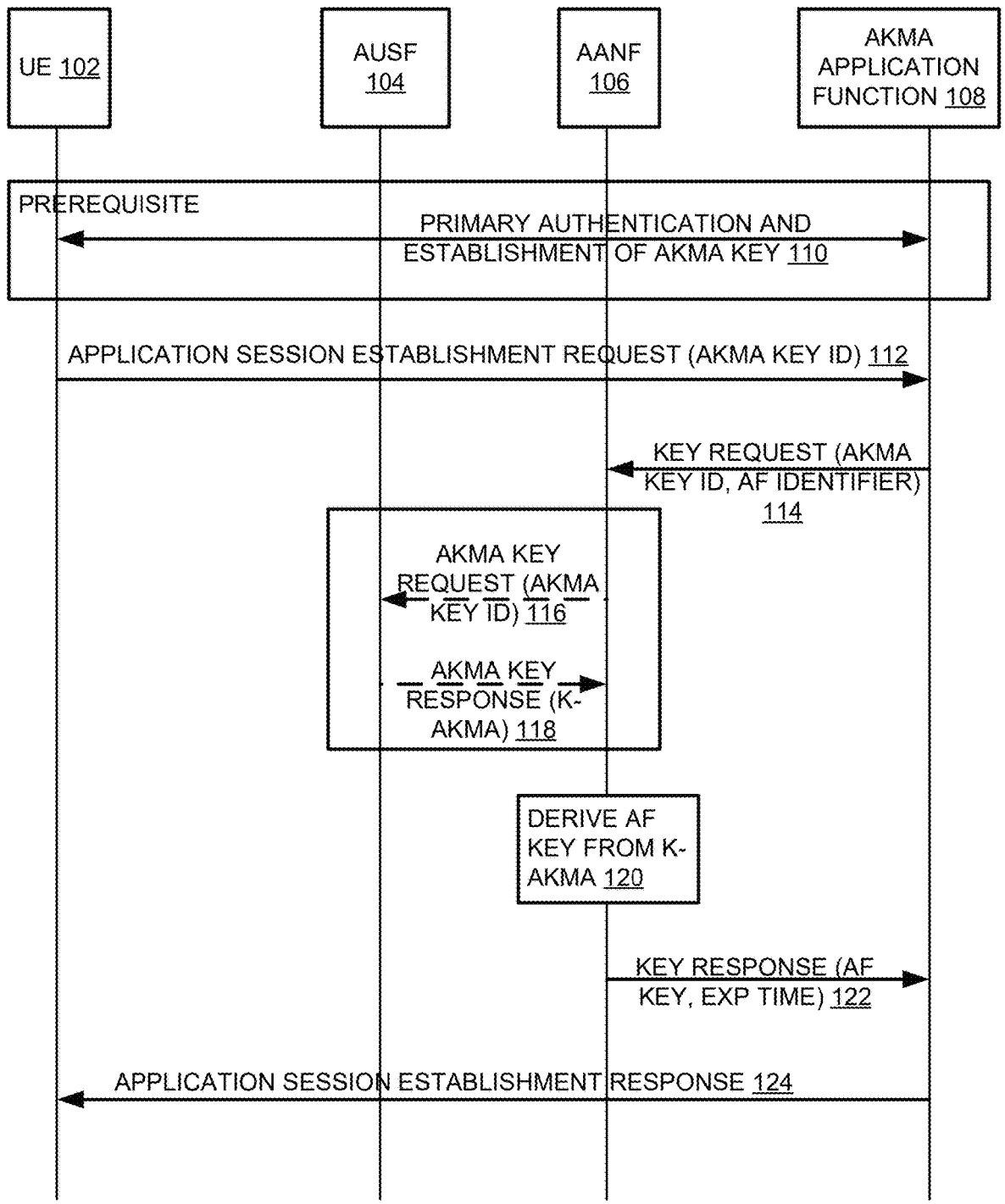
FIG. 1 is an example signaling process for an AF key generation procedure.

The application function (AF) key generation procedure can be provided with respect to FIG. 1. FIG. 1 is an example signaling process for an AF key generation procedure.

When a user equipment (UE) (or simply "terminal") initiates communication with the AKMA AF, it can include the derived AKMA key identifier in the message.

The AKMA key identifier (ID) (KAKMA ID) may be used to locate the authentication server function (AUSF) in which the KAKMA is stored and can be further used in that AUSF to locate the KAKMA. However, because the key identifier may not include any information relating to a specific AUSF instance, the AAnF may not correctly select a proper AUSF instance based on the key identifier.

In many cases, an attempt to solve this problem may include invoking the unified data management (UDM) node to locate the AUSF which holds the KAKMA. The key ID in this attempt may be designed to include UE ID information (e.g., generic public subscription identifier (GPSI)).

As shown in FIG. 1, the UE 102 and AKMA application function 108 may, as a prerequisite, implement primary authentication and establishment of an AKMA key 110. The UE 102 may send an application session establishment request (AKMA key ID) 112 to the AKMA application function 108.

The AKA application function 108 can send a key request including an AKMA key ID and AF identifier 114 to a AANF 106. The AANF 106 can send an AKMA key request including the AKMA key ID 116 to the AUSF 104. The AUSF 104 can send an AKMA key response including K-AKMA 118 to the AANF 106. The AANF 106 can derive an AF key from K-AKMA 120.

The AANF 106 can send a key response including the AF key and expiration time 122 to the AKMA application function 108. The AKMA application function 108 can send an application session establishment response 124 to the UE 102.

Figure 2:
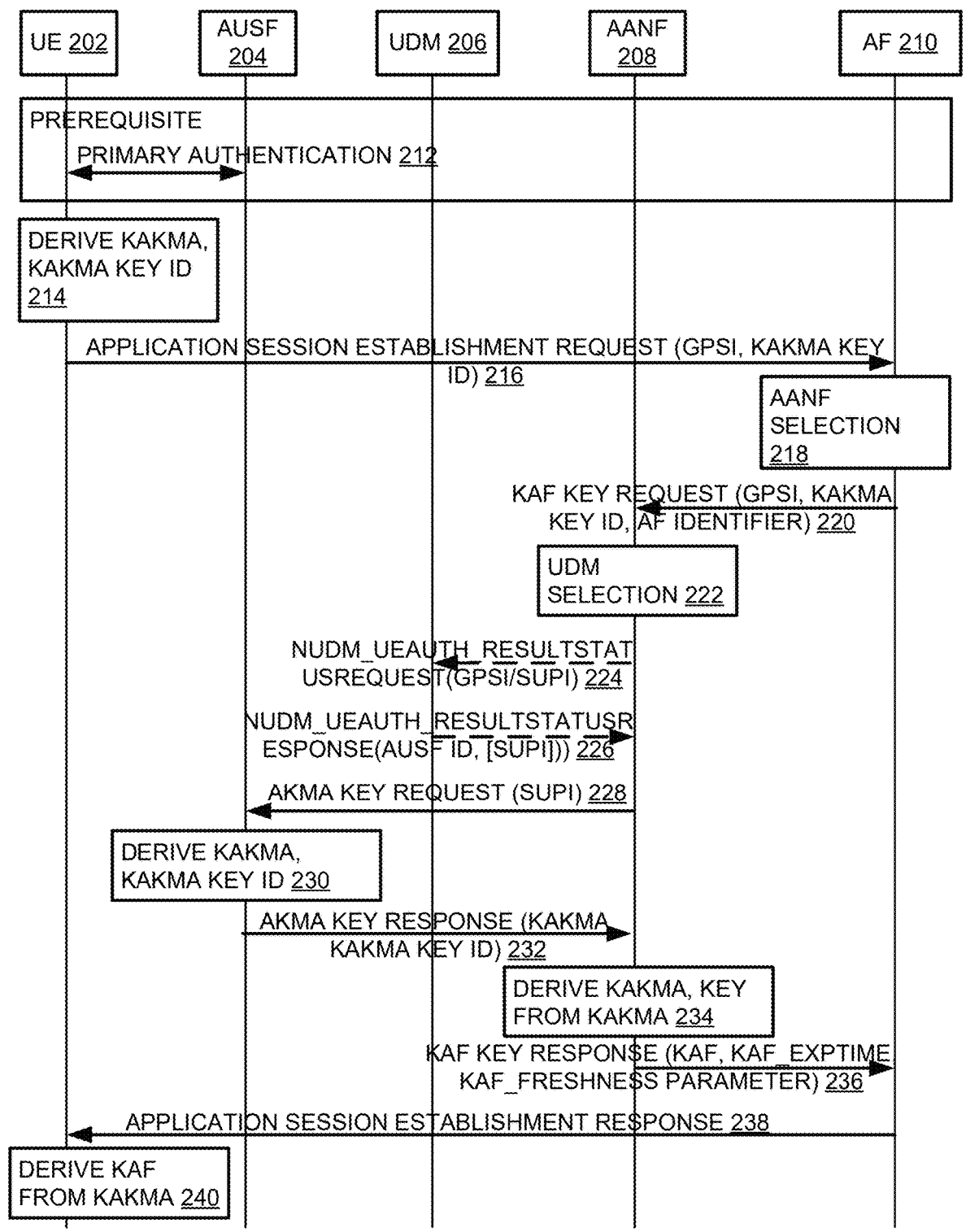
FIG. 2 is an example signaling processing for a KAF derivation process.

FIG. 2 is an example signaling processing for a KAF derivation process. The AKMA Anchor Function (AAnF) can check if it has the UE specific KAKMA key identified by the KAKMA key identifier. If KAKMA is available in the AAnF, the AAnF can proceed to derive a KAKMA and a key from KAKMA. If KAKMA is not available, the AAnF can select a suitable UDM for the UE via NRF based on the Home Network identifier and Routing Indicator included in the KAKMA key identifier and/or on the GPSI received from the AF.

The AAnF can send a Nudm_UEAuth_ResultStatus Request to the UDM to retrieve the identifier of the latest AUSF that authenticated the UE. The AAnF can provide a UE identifier. If the AAnF only has the UE GPSI provided by the AF in Step 3 then the AAnF can include the GPSI. If the AAnF already has both the UE GPSI and its corresponding Subscription Permanent Identifier (SUPI) from a previous interaction with the UDM, it can include the SUPI.

The UDM can check if the AAnF has provided GPSI or SUPI as a UE identifier. If the AAnF has provided a GPSI, the UDM can translate the GPSI to a SUPI and shall use the SUPI to retrieve the information of the identifier of the AUSF instance that authenticated the UE. The UDM can send a Nudm_UEAuth_ResultStatus Response including the AUSF instance identifier of the last AUSF which reported a successful primary authentication to the UDM and the UE SUPI if the AAnF has provided GPSI as a UE identifier. The UE SUPI may be provided for the subsequent AKMA key request to the AUSF and future AUSF selection procedures via the UDM for the same UE.

The AAnF can send a KAKMA key request to the AUSF by providing the UE SUPI. However, in case the UE has two separate registrations over both a 3GPP and a Non-3GPP access to two public land mobile networks (PLMNs), there may be two AUSF instances which authenticated the UE. Thus, the SUPI may be used to retrieve the information of the identifier of the AUSF instance that authenticated the UE in a Nudm_UEAuth_ResultStatusResponse message is unsuccessful. The query in the UDM may hit a result of two AUSF instances but may be unable to identify which one holds the KAKMA.

As shown in FIG. 2, the UE 202 and AUSF 204 can implement, as a prerequisite, a primary authentication procedure 212. The UE 202 can derive KAKMA and a KAKMA key ID 214. The UE 202 can send an application session establishment request including GPSI and a KAKMA key ID 216 to the AF 210. The AF 210 can perform AANF selection 218. The AF 210 can send a KAF key request including a GPSI and KAKMA key ID and an AF identifier 220 to the AANF 208.

The AANF 208 can perform UDM selection 222. The AANF 208 can send a Nudm_UEAuth_ResultStatusRequest message 224 including GPSI and SUPI to the UDM 206. The UDM 206 can send a Nudm_UEAuth_ResultStatusResponse message 226 including an AUSF ID and SUPI to the AANF 208. The AANF 208 can send a AKMA key request including a SUPI 228 to the AUSF 204. The AUSF 204 can derive KAKMA and a KAKMA key ID 230.

The AUSF 204 can send an AKMA key response including a KAKMA and KAKMA key ID 232 to the AANF 208. The AANF 208 can derive a KAKMA and a key from KAKMA 234. The AANF 208 can send a KAF key response 236 including a KAF, KAF expiration time, and a KAF freshness parameter to the AF 210. The AF 210 can send an application session establishment response 238 to the UE 202. The UE can then derive KAF from KAKMA 240.

Figure 3:
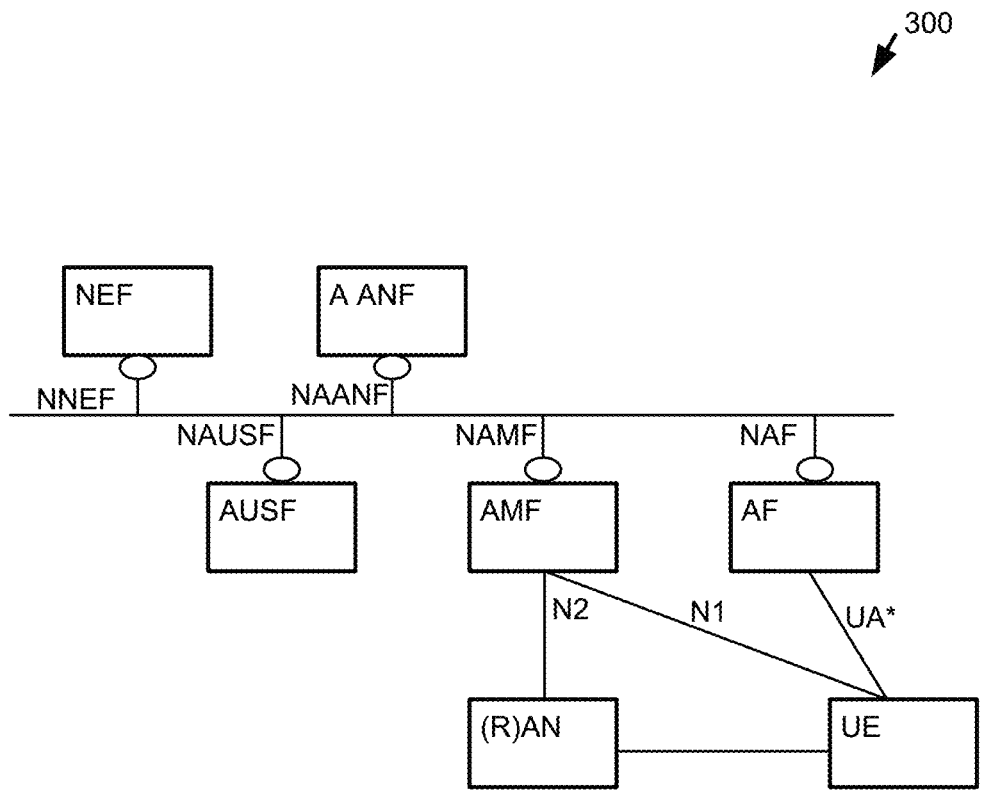
FIG. 3 is a block diagram of an example AKMA architecture.

FIG. 3 is a block diagram of an example AKMA architecture 300. The architecture 300 can include any of a NEF, AAnF, AUSF, AMF, AF, RAN, and UE. The nodes can be connected via any of a Nnef, Naanf, Nausf, Namf, Naf, N1, N2, and UA*.

Figure 4:
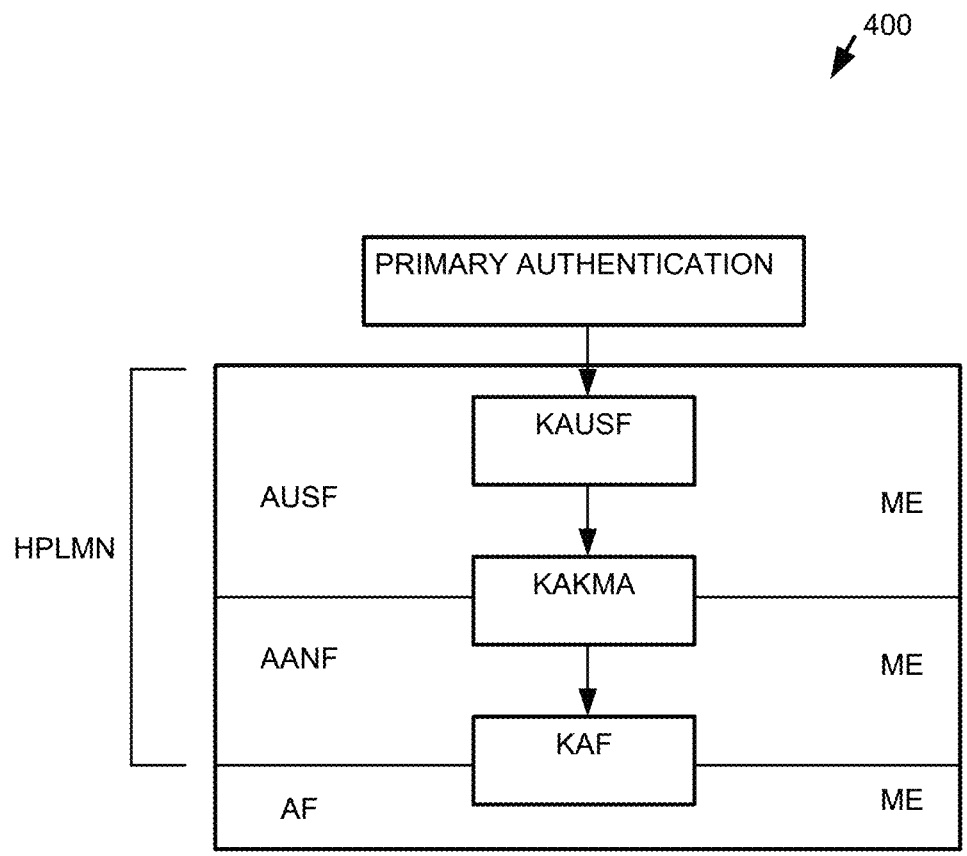
FIG. 4 is a block diagram of an example key hierarchy of AKMA.

FIG. 4 is a block diagram of an example key hierarchy of AKMA 400. The key hierarchy can include any of a KAUSF, KAKMA, and a KAF. The HPLMN can include an AUSF and AAnF. The hierarchy can include any of an AF and ME.

The AKMA service may require a new logical entity: An AKMA Anchor function (AAnF). The AAnF may include the anchor function in a home public land mobile network (HPLMN) that can generate the key material to be used between the UE and the AF and maintains UE AKMA contexts to be used for subsequent bootstrapping requests.

There may be no separate authentication of the UE to support AKMA functionality. Instead, it may reuse the primary authentication procedure executed during the UE Registration to authenticate the UE. A successful primary authentication can result in KAUSF being stored at the AUSF and the UE.

Figure 5:
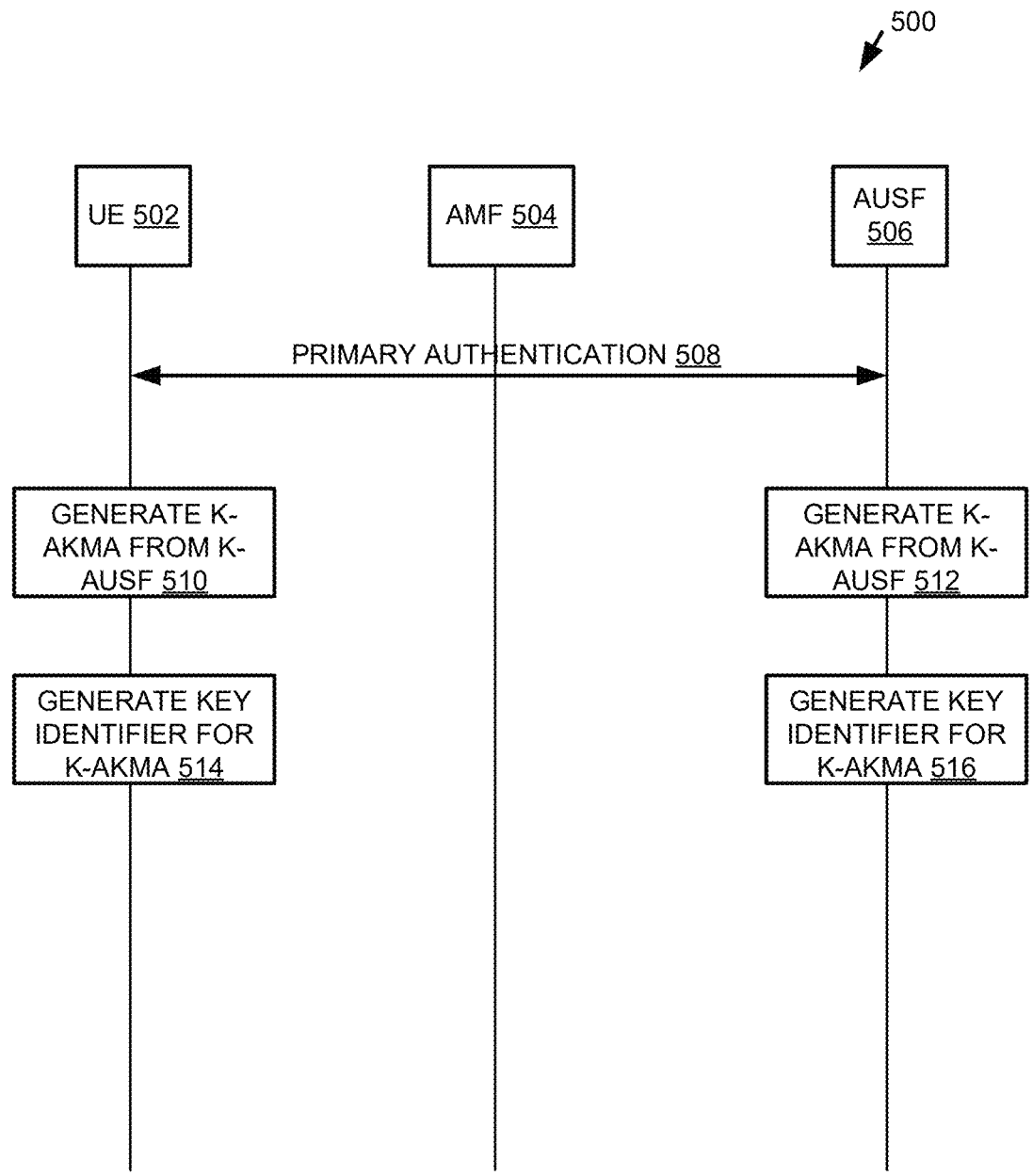
FIG. 5 is an example signaling process for deriving AKMA root key during UE registration.

FIG. 5 is an example signaling process 500 for deriving AKMA root key during UE registration. The UE 502 and AUSF 506 may perform primary authentication 508. The UE 502 and/or AUSF 506 can generate K-AKMA from K-AUSF 510, 512. The UE 502 and/or AUSF 506 can generate a key identifier for K-AKMA 514, 516. The UE and the AUSF can generate the AKMA Anchor Key (KAKMA) and the associated key identifier from KAUSF as part of the UE Registration procedure. The KAKMA key identifier can identify the KAKMA key of the UE from which other AKMA keys are derived.

System Overview

Wireless devices have become ubiquitous and users are increasingly relying on wireless communication for transmission and reception of confidential data. Examples of confidential data includes data derived from phone conversation, financial transactions, and so on. For upcoming 5G deployments, data security becomes more important, not only because of increased use of wireless communication, but also because many wireless devices will be in proximity of each other and will be able to receive (at a physical layer level) signals from neighboring wireless devices. Furthermore, different from present day wireless systems, wireless devices may move around in coverage area of different base stations due to denser deployments. Therefore, increased security that, at the same time, allows for seamless mobility will be important for successful operation of wireless technology.

The techniques described in the present application will enable address these technical issues, and others.

Figure 6:
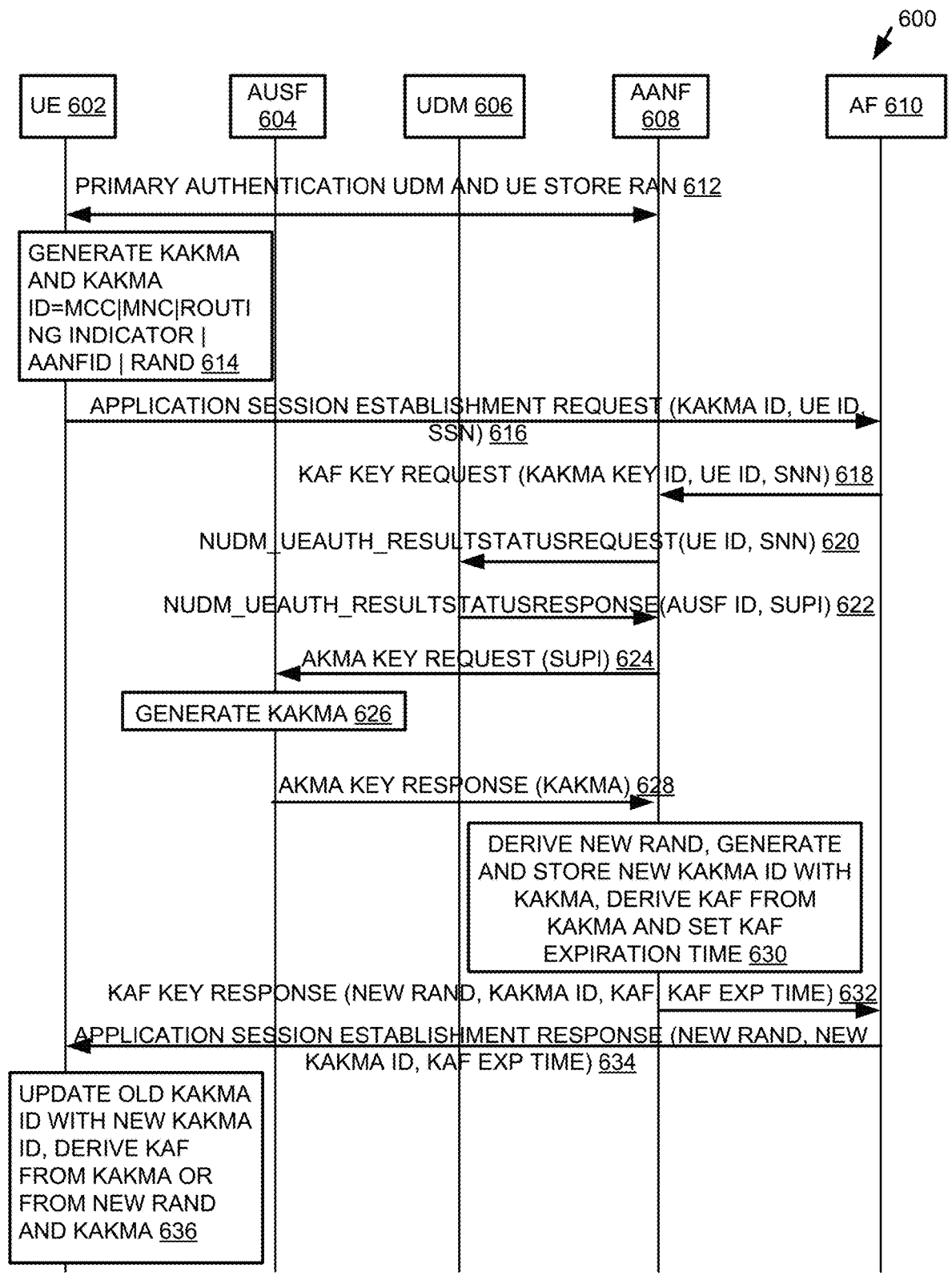
FIG. 6 is an example signaling process for AUSF selection in the case of dual registrations in AKMA.

The present embodiments relate to a method and system for AUSF selection in the case of dual registrations in AKMA. FIG. 6 is an example signaling process 600 for AUSF selection in the case of dual registrations in AKMA.

In step 612, the UE 602, AUSF 604, UDM 606, and/or AANF 608 can implement a primary authentication procedure that includes the UDM and UE storing RAN information. A successful 5G primary authentication can result in KAUSF being stored at the AUSF and the UE. The UDM can store the RAND which is generated and used in the authentication vector (AV) in a primary authentication and AUSF ID with the authentication status of the UE (e.g., SUPI, authentication result, timestamp, and the serving network name). The UE can store the RAND which is generated and used in the authentication vector (AV) in a primary authentication.

In step 614, the UE 602 can generate KAKMA and KAKMA ID=MCC, MNC, routing indicator, AaNF ID, and/or RAND. The UE can generate the AKMA Anchor Key (KAKMA) after or as part of the UE registration procedure. KAKMA can be derived from KAUSF. Further, the UE can generate an AKMA Anchor Key identifier KAKMA ID.

The KAKMA ID may include an identifier used by the UE for subsequent requests towards AFs. The KAKMA ID may include a combination of MCC, MNC, routing indicator, AAnF ID, and RAND, where the MCC can uniquely identify the country, the MNC can identify the home PLMN, the routing indicator may be used to route network signaling with the KAKMA ID to UDM instances, the AAnF ID may be the identifier used to identify an AAnF entity or in the initial case (when UE have no information of AAnF), AAnF ID may be a default value, the RAND may be generated and used in the authentication vector (AV) in a primary authentication. The UE may store the KAKMA and KAKMA identifier KAKMA ID.

In step 616, the UE 602 can send an application session establishment request message including KAKMA ID, UE ID, and/or SNN to the AF 610. The UE can start communication with the AF with an application session establishment request. The request may include KAKMA ID, UE ID and the Serving Network Name (SNN) of the network in which the UE is registered to and AKMA is enabled.

In step 618, the AF 610 can send a KAF key request with a KAKMA key ID, UE ID, and/or SNN to the AANF 608. The AF can send the key request to the AAnF with the KAKMA ID, UE ID and the SNN received from the UE to request an AF specific key for the UE. The AF also may include its identity (e.g., AF identifier) in the request. AF can select the AAnF based on the KAKMA ID.

In step 620, the AANF 608 can send a Nudm_UEAuth_ResultsStatusRequest message that includes any of the UE ID and SNN to the UDM 606. The AAnF can check if it has the UE specific KAKMA key by the KAKMA ID. If KAKMA is available in the AAnF, the AAnF can proceed to operation step 630, which is discussed in greater detail below. If KAKMA is not available, the AAnF can send a Nudm_UE Auth_Result Status Request to the UDM to retrieve the identifier of the latest AUSF that authenticated the UE and the SUPI of the UE. The AAnF can provide the UE ID and the SNN.

In step 622, the UDM 606 can send a Nudm_UEAuth_ResultStatus Response message to the AANF 608. The UDM can retrieve the information of the identifier of the AUSF instance that authenticated the UE and SUPI of the UE based on the UE ID and the SNN. The UDM can send a Nudm_UEAuth_ResultStatus Response including the AUSF instance identifier of the last AUSF that reported a successful primary authentication to the UDM and the UE SUPI.

In step 624, the AANF 608 can send an AKMA key request including the SUPI to the AUSF 604. The AAnF can send the key request to AUSF by providing the UE SUPI. The AANF can identify the particular AUSF based on the AUSF ID included in the Nudm_UEAuth_ResultStatus Response.

In step 626, the AUSF 604 can generate KAKMA. The AUSF can retrieve KAUSF according to the SUPI and generates KAKMA from KAUSF.

In step 628, the AUSF 604 can send an AKMA key response including KAKMA to the AANF 608.

In step 630, the AANF 608 can derive a new RAND, generate and store a new KAKMA ID with KAKMA, derive a KAF from KAKMA, and set a KAF expiration time. The AAnF can generate a new RAND and further generate a new KAKMA ID based on the new RAND. The new KAKMA ID may include a combination of MCC, MNC, routing indicator, AAnF ID, and the new RAND. MCC, MNC and Routing Indicator may be the same as the corresponding parts of the old KAKMA ID. AAnF ID may be the identity of the current AAnF. The AAnF may store KAKMA and KAKMA identifier with the new KAKMA ID. The AAnF can derive KAF based on KAKMA. The AAnF may set the KAF expiration time. The AAnF can also derive KAF based on KAKMA and the new RAND which is generated by the AAnF.

In step 632, the AANF 608 can send a KAF key response including any of a new RAND, KAKMA ID, KAF, and/or KAF expiration time to the AF 610. The AAnF can send the key response information to the AF. It may include AAnF ID, new RAND, new KAKMA ID, KAF and the key expiration time. AAnF ID can include the identity of the AAnF, AAnF ID can be a domain name (e.g., AAnF_server_domain_name).

In step 634, the AF 610 can send an application session establishment response including any of the new RAND, new KAKMA ID, and/or the KAF expiration time to the UE 602. The AF can receive and store the AAnF ID, KAF, and the key expiration time. Further, the AF can send an application session establishment response information to the UE. The response information may include the new KAKMA ID and the KAF key expiration time.

In step 636, the UE 602 can update an old KAKMA ID with the new KAKMA ID, derive KAF from KAKMA or from new RAND and KAKMA. The UE can update the old KAKMA ID with the received new KAKMA ID. The UE can store KAKMA and new KAKMA ID and may delete the old KAKMA ID. The UE can derive KAF based on KAKMA. The UE can also derive KAF based on KAKMA and the received new RAND which is generated by the AAnF.

The serving network name (SNN) may include a SNN-service-code and a SNN-network-identifier, delimited by a colon. The SNN-network-identifier can identify the serving PLMN or the serving SNPN.

MCC and MNC in the SNN-PLMN-ID may be a MCC and MNC of the serving PLMN. If the MNC of the serving PLMN has two digits, then a zero may be added at the beginning. MCC and MNC in the SNN-SNPN-ID may be the MCC and MNC of the serving SNPN. If the MNC of the serving SNPN has two digits, then a zero may be added at the beginning. SNN-NID may include an NID in hexadecimal digits. Below is a table illustrating ABNF syntax of SNN.

TABLE 1

SNN = SNN-service-code ":" SNN-network-identifier
SNN-service-code = %x35.47; "5G"
SNN-network-identifier = SNN-PLMN-ID / SNN-SNPN-ID
SNN-PLMN-ID = SNN-mnc-string SNN-mnc-digits "." SNN-mcc-string SNN-mcc-digits "." SNN-3gppnetwork-string "." SNN-org-string ; applicable when not operating in SNPN access mode.
SNN-SNPN-ID = SNN-mnc-string SNN-mnc-digits "." SNN-mcc-string SNN-mcc-digits "." SNN-3gppnetwork-string "." SNN-org-string ":" SNN-NID ; applicable when operating in SNPN access mode.
SNN-mnc-digits = DIGIT DIGIT DIGIT ; MNC of the PLMN ID
SNN-mcc-digits = DIGIT DIGIT DIGIT ; MCC of the PLMN ID
SNN-mnc-string = %x6d.6e.63 ; "mnc" in lower case
SNN-mcc-string = %x6d.63.63 ; "mcc" in lower case
SNN-3gppnetwork-string = %x33.67.70.70.6e.65.74.77.6f.72.6b ; "3gppnetwork" in lower case TABLE 1-continued

```
SNN-org-string = %x6f.72.67 ; "org" in lower case
SNN-NID = 11SNN-hexadecimal-digit ; NID in hexadecimal digits
SNN-hexadecimal-digit = DIGIT / %x41 / %x42 / %x43 / %x44 / %x45 / %x46
```

The SNN-service-code may allow for distinguishing of ANID and SNN as either of SNN or ANID can be carried in a AT_KDF_INPUT attribute.

In a first example, in the case of a PLMN, if PLMN ID contains MCC=234 and MNC=15, SNN can be 5G:mnc015.mcc234.3gppnetwork.org.

The parameter as described herein can be either SNN or SNN-network-identifier. The Serving Network Name (SNN) can be sent from the UE to the AF along with KAKMA ID and UE ID. The SNN and UE ID may then be sent to AAnF and UDM. The UDM may use both the SNN and the UE ID to retrieve the identifier of the AUSF instance which holds the KAKMA. In case of dual registrations, SNN may be used to complete the AUSF selection in the UDM. The parameter can be either SNN or SNN-network-identifier.

Figure 7:
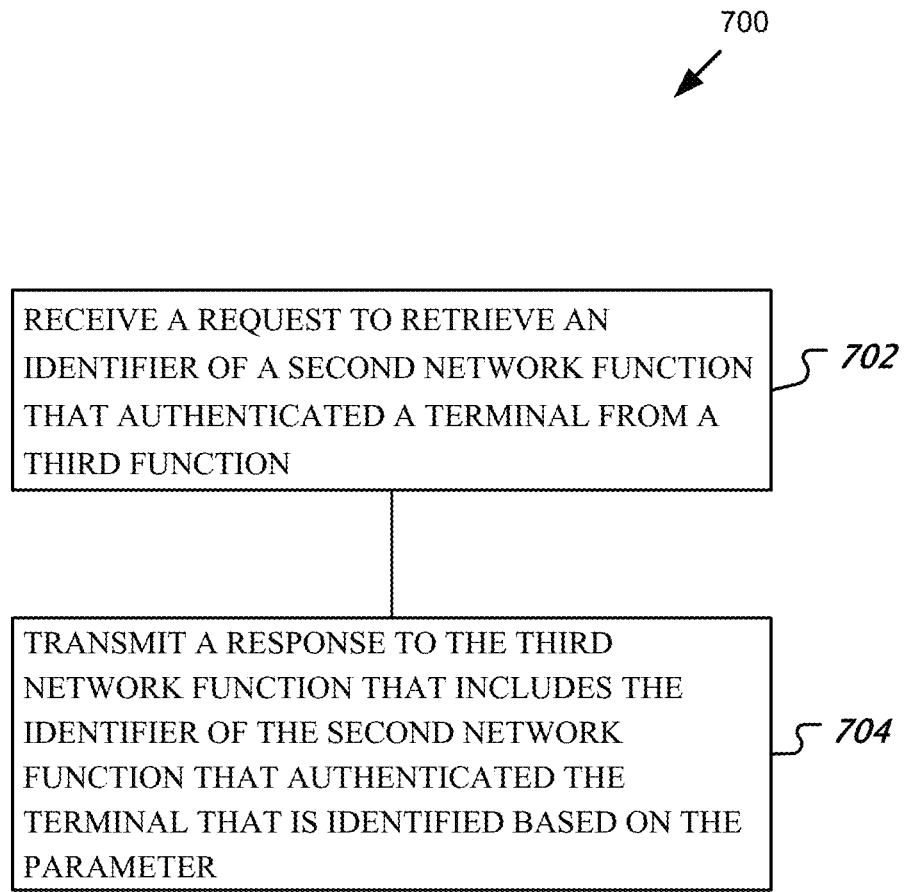
FIG. 7 is an example method for AUSF selection in the case of dual registrations in AKMA.

FIG. 7 is an example method 700 for AUSF selection in the case of dual registrations in AKMA. The method can include receiving, by a first network function, a request to retrieve an identifier of a second network function that authenticated a terminal from a third function (block 702). The request can include a parameter.

The method can also include transmitting, by the first network function, a response to the third network function that includes the identifier of the second network function that authenticated the terminal that is identified based on the parameter (block 704).

In some embodiments, the first network function comprises a unified data management (UDM) function.

In some embodiments, the second network function comprises an Authentication Server Function (AUSF).

In some embodiments, the third network function includes an Authentication and Key Management Application (AKMA) anchor function (AAnF).

In some embodiments, the response includes a subscriber permanent identifier (SUPI).

In some embodiments, the parameter includes a serving network name.

In some embodiments, the request includes an identifier of the terminal.

In some embodiments, the parameter includes a serving network name network identifier.

In some embodiments, the method includes identifying, by the first network function, a record in a database that corresponds to the second network function that authenticated the terminal based on the parameter; and retrieving, by the first network function, the identifier of the second network function that authenticated the terminal and the SUPI included in the record in the database.

In some embodiments, the third network function is configured to send a key request message to the second network function that is identified based on the identifier of the second network function that authenticated the terminal, the key request message including the SUPI.

In some embodiments, the second network function is configured to receive an AKMA key identifier, an identifier of the terminal, and the parameter from a fourth network function.

In some embodiments, the fourth network function is an AKMA application function (AF).

In some embodiments, the fourth network function is configured to receive the AKMA key identifier, the identifier of the terminal, and the parameter from the terminal.

In another exemplary embodiment, a method for communication includes transmitting, by a first network function, a request to retrieve an identifier of a second network function that authenticated a terminal from a third network function, the request including a parameter; and receiving, by the first network function, a response from the third network function, the response including the identifier of the second network function that authenticated the terminal that is identified based on the parameter.

In some embodiments, the first network function comprises an Authentication and Key Management Application (AKMA) anchor function (AAnF).

In some embodiments, the second network function comprises an Authentication Server Function (AUSF).

In some embodiments, the third network function comprises a unified data management (UDM) function.

In some embodiments, the response includes a subscriber permanent identifier (SUPI).

In some embodiments, the parameter includes a serving network name.

In some embodiments, the request includes an identifier of the terminal.

In some embodiments, the parameter includes a serving network name network identifier.

In some embodiments, the third network function is configured to identify a record in a database that corresponds to the second network function that authenticated the terminal based on the parameter and retrieve the identifier of the second network function that authenticated the terminal and the SUPI included in the record in the database.

In some embodiments, the method includes transmitting, by the first network function, a key request message to the second network function that is identified based on the identifier of the second network function that authenticated the terminal, the key request message including the SUPI.

In some embodiments, the method includes receiving, by the first network function, an AKMA key identifier, the identifier of the terminal, and the parameter from a fourth network function.

In some embodiments, the fourth network function comprises an AKMA application function.

In some embodiments, the fourth network function is configured to receive the AKMA key identifier, the identifier of the terminal, and the parameter from the terminal.

Example Wireless System

Figure 8:
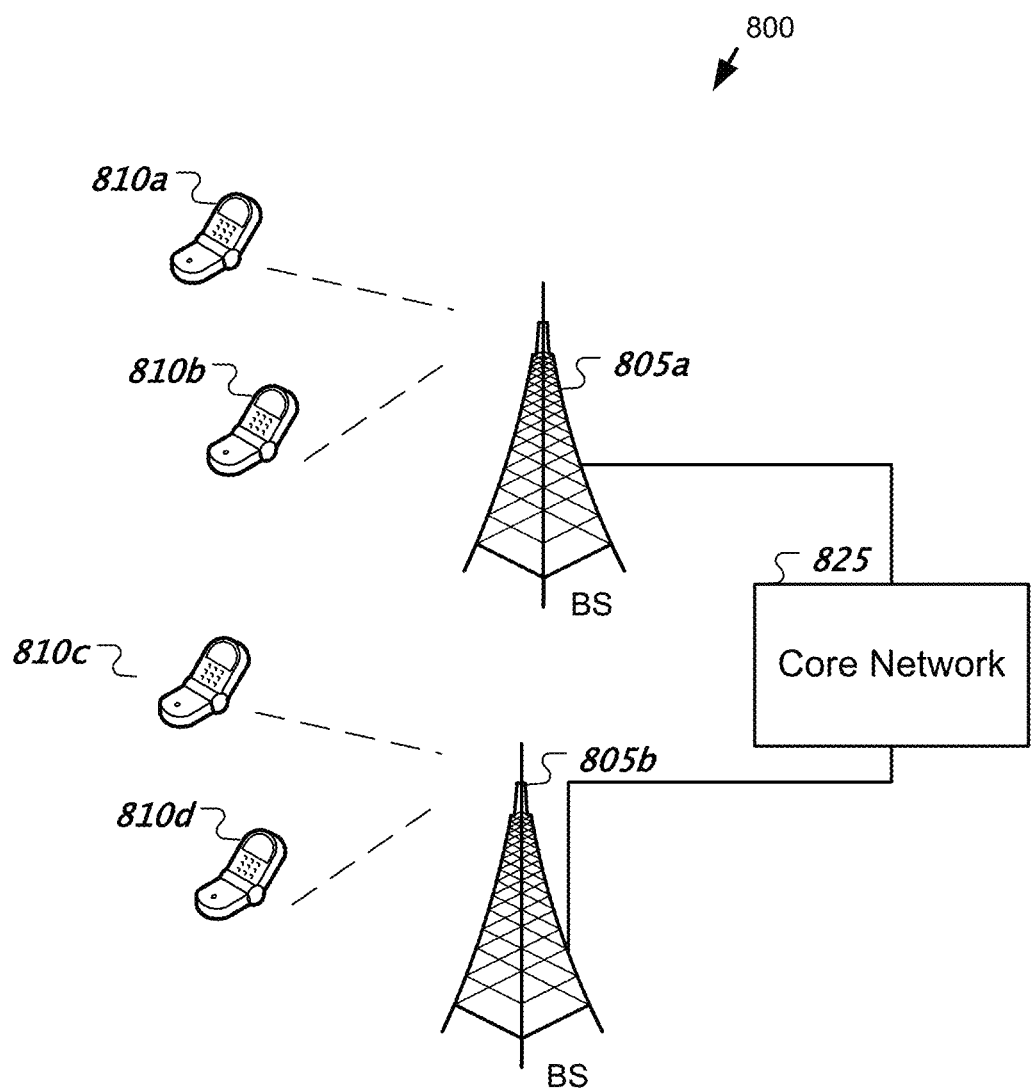
FIG. 8 shows an example of a wireless communication system where techniques in accordance with one or more embodiments of the present technology can be applied.

FIG. 8 shows an example of a wireless communication system where techniques in accordance with one or more embodiments of the present technology can be applied. A wireless communication system 800 can include one or more base stations (BSs) 805a, 805b, one or more wireless devices 810a, 810b, 810c, 810d, and a core network 825. A base station 805a, 805b can provide wireless service to wireless devices 810a, 810b, 810c and 810d in one or more wireless sectors. In some implementations, a base station 805a, 805b includes directional antennas to produce two or more directional beams to provide wireless coverage in different sectors.

The core network 825 can communicate with one or more base stations 805a, 805b. The core network 825 provides connectivity with other wireless communication systems and wired communication systems. The core network may include one or more service subscription databases to store information related to the subscribed wireless devices 810a, 810b, 810c, and 810d. A first base station 805a can provide wireless service based on a first radio access technology, whereas a second base station 805b can provide wireless service based on a second radio access technology. The base stations 805a and 805b may be co-located or may be separately installed in the field according to the deployment scenario. The wireless devices 810a, 810b, 810c, and 810d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 9:
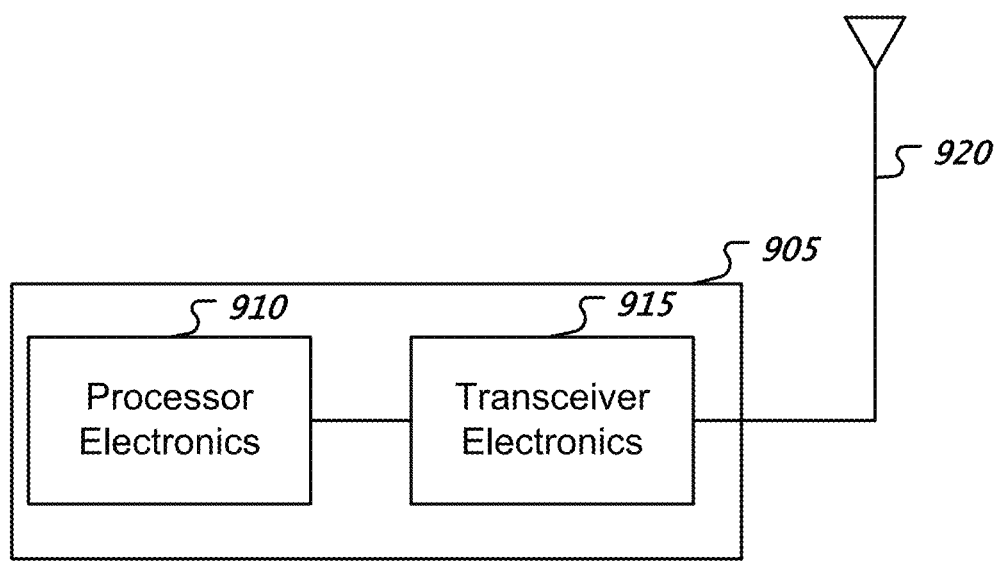
FIG. 9 is a block diagram representation of a portion of a hardware platform.

FIG. 9 is a block diagram representation of a portion of a hardware platform. A hardware platform 905 such as a network device or a base station or a wireless device (or UE) can include processor electronics 910 such as a microprocessor that implements one or more of the techniques presented in this document. The hardware platform 905 can include transceiver electronics 915 to send and/or receive wired or wireless signals over one or more communication interfaces such as antenna 920 or a wireline interface. The hardware platform 905 can implement other communication interfaces with defined protocols for transmitting and receiving data. The hardware platform 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the hardware platform 905.

CONCLUSION

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for data communication, comprising:
   receiving, by a first network function, a first Authentication and Key Management Application (AKMA) key identifier, an identifier of a terminal, and a Serving Network Name (SNN) from a fourth network function, wherein the fourth network function received the first AKMA key identifier, the identifier of the terminal, and the SNN from the terminal via an application session request;
   transmitting, by the first network function, a first request to retrieve an identifier of a second network function that authenticated the terminal to a third network function, the first request including the SNN obtained from the application session request;
   receiving, by the first network function, a response from the third network function, the response including the identifier of the second network function that authenticated the terminal, the identifier of the second network function being identified based on the SNN;
   receiving, by the first network function, an AKMA key from the second network function, in response to transmitting a key request message to the second network function using the identifier of the second network function;
   generating, by the first network function, (i) a new random number (RAND) and (ii) a new AKMA key identifier for the AKMA key based on the new RAND, wherein the new AKMA key identifier generated based on the new RAND is different from the first AKMA key identifier included in the application session request originating from the terminal; and
   transmitting, by the first network function, the new AKMA key identifier to initiate communication with the terminal via an application session establishment response and update the first AKMA key identifier with the new AKMA key identifier, wherein the first network function comprises an Authentication and Key Management Application (AKMA) anchor function (AAnF), the second network function comprises an Authentication Server Function (AUSF), and the third network function comprises a unified data management (UDM) function.

2. The method of claim 1, wherein the response includes a subscriber permanent identifier (SUPI).

3. The method of claim 2, wherein the third network function is configured to identify, based on the SNN, a record in a database that corresponds to the second network function that authenticated the terminal and retrieve the identifier of the second network function that authenticated the terminal and the SUPI included in the record in the database.

4. The method of claim 2, further comprising transmitting, by the first network function, the key request message to the second network function that is identified based on the identifier of the second network function that authenticated the terminal, the key request message including the SUPI.

5. The method of claim 1, wherein function comprises an AKMA application function.

6. An apparatus for communication comprising processor electronics and a memory storing instructions that, when executed by the processor electronics, cause the apparatus to:
   receive, by a first network function, a first Authentication and Key Management Application (AKMA) key identifier, an identifier of a terminal, and a Serving Network Name (SNN) from a fourth network function, wherein the fourth network function received the first AKMA key identifier, the identifier of the terminal, and the SNN from the terminal via an application session request;
   transmit, by the first network function, a first request to retrieve an identifier of a second network function that authenticated the terminal to a third network function, the first request including the SNN obtained from the application session request;
   receive, by the first network function, a response from the third network function, the response including the identifier of the second network function that authenticated the terminal, the identifier being identified based on the SNN;
   receive, by the first network function, an AKMA key from the second network function, in response to transmitting a key request message to the second network function using the identifier of the second network function;
   generate, by the first network function, (i) a new random number (RAND) and (ii) a new AKMA key identifier for the AKMA key based on the new RAND, wherein the new AKMA key identifier generated based on the new RAND is different from the first AKMA key identifier included in the application session request originating from the terminal; and
   transmit, by the first network function, the new AKMA key identifier to initiate communication with the terminal via an application session establishment response and update the first AKMA key identifier with the new AKMA key identifier, wherein the first network function comprises an Authentication and Key Management Application (AKMA) anchor function (AAnF), the second network function comprises an Authentication Server Function (AUSF), and the third network function comprises a unified data management (UDM) function.

7. The apparatus of claim 6, wherein the third network function is configured to identify, based on the SNN, a record in a database that corresponds to the second network function that authenticated the terminal and retrieve the identifier of the second network function that authenticated the terminal and a SUPI included in the record in the database.

8. The method of claim 1, further comprising deriving, by the first network function, an application function (AF) key based on the new RAND generated by the first network function.

9. The method of claim 1, wherein the generating the new AKMA key identifier for the AKMA key is by the first network function is further based on an identifier of the first network function.

10. The method of claim 1, wherein the new AKMA key identifier is transmitted by the first network function to an AKMA application function for provisioning to the terminal via the application session response that includes both (i) the new RAND and (ii) the new AKMA key identifier.

11. The apparatus of claim 6, wherein the response includes a subscriber permanent identifier (SUPI).

12. The apparatus of claim 6, wherein the instructions further cause the apparatus to transmit, from the first network function, the key request message to the second network function that is identified based on the identifier of the second network function that authenticated the terminal, the key request message including a SUPI.

13. The apparatus of claim 6, wherein the fourth network function comprises an AKMA application function.

14. The apparatus of claim 6, wherein the instructions further cause the apparatus to: derive, at the first network function, an application function (AF) key based on the new RAND generated by the first network function.

15. The apparatus of claim 6, wherein the new AKMA key identifier for the AKMA key is further generated by the first network function based on an identifier of the first network function.

16. The apparatus of claim 6, wherein the new AKMA key identifier is transmitted by the first network function to an AKMA application function for provisioning to the terminal via the application session response that includes both (i) the new RAND and (ii) the new AKMA key identifier.

\* \* \* \* \*